United States Patent
Ogura

(10) Patent No.: US 11,465,629 B2
(45) Date of Patent: Oct. 11, 2022

(54) RECOGNITION PROCESSING APPARATUS, RECOGNITION PROCESSING METHOD, AND RECOGNITION PROCESSING PROGRAM

(71) Applicant: JVCKENWOOD CORPORATION, Yokohama (JP)

(72) Inventor: Takuya Ogura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 124 days.

(21) Appl. No.: 16/886,603

(22) Filed: May 28, 2020

(65) Prior Publication Data

US 2020/0290623 A1 Sep. 17, 2020

Related U.S. Application Data

(63) Continuation of application No. PCT/JP2017/009896, filed on Mar. 12, 2019.

(30) Foreign Application Priority Data

Aug. 10, 2018 (JP) .............................. JP2018-150967

(51) Int. Cl.
*B60W 40/04* (2006.01)
*B60W 60/00* (2020.01)
(Continued)

(52) U.S. Cl.
CPC ......... *B60W 40/04* (2013.01); *B60R 21/0134* (2013.01); *B60W 60/0017* (2020.02);
(Continued)

(58) Field of Classification Search
CPC ............. B60W 40/04; B60W 60/0017; B60W 2420/40; B60W 2554/4029; B60R 21/0134; B60R 2021/003; G06K 9/00805
See application file for complete search history.

(56) References Cited

U.S. PATENT DOCUMENTS 9,604,639 B2    3/2017  Laur et al.
2007/0222565 A1*  9/2007  Kawamata ............. G06V 20/58
                                                                348/148
(Continued)

FOREIGN PATENT DOCUMENTS

JP       2006-350699 A      12/2006
JP       2006350699 A  *  12/2006
(Continued)

OTHER PUBLICATIONS

Pedestrian Detection by Shashank Deshpande and Yang Cai, Chapter 10 of Computer Vision and Imaging an Intelligent Transportation Systems (IEEE Press) ed. Robert P. Loce, Raja ala et al. May 1, 2017 (Year: 2017).*

(Continued)

*Primary Examiner* — Peter D Nolan
*Assistant Examiner* — Tanya C Sienko
(74) *Attorney, Agent, or Firm* — Procopio, Cory, Hargreaves & Savitch LLP

(57) ABSTRACT

A recognition processing apparatus includes a video acquisition unit configured to acquire first captured image data of surroundings of a host vehicle captured by a far-infrared camera, an other vehicle detection unit configured to detect another vehicle parked or stopped in the surroundings of the host vehicle, a heat detection unit configured to detect radiated heat associated with an operation of the other vehicle based on a thermal distribution in a region corresponding to the other vehicle in the first captured image data, and a person detection unit configured to, when the radiated heat has been detected, preferentially execute person recognition in a vicinity of the other vehicle to detect a person. The recognition processing apparatus can ascertain the possibility that a person gets out of a detected vehicle and promptly detect such a person.

9 Claims, 3 Drawing Sheets

(51) Int. Cl.
 B60R 21/0134 (2006.01)
 G06V 20/58 (2022.01)
 B60R 21/00 (2006.01)
(52) U.S. Cl.
 CPC ........ *G06V 20/58* (2022.01); *B60R 2021/003* (2013.01); *B60W 2420/40* (2013.01); *B60W 2554/4029* (2020.02)

(56) References Cited

U.S. PATENT DOCUMENTS

| 2013/0235202 | A1  | 9/2013 | Nagaoka et al. |
| 2017/0154241 | A1* | 6/2017 | Shambik ................ G06V 20/58 |
| 2018/0236986 | A1* | 8/2018 | Kim ...................... G01S 13/345 |

FOREIGN PATENT DOCUMENTS

| JP | 2007-241898 A | 9/2007 |
| JP | 2007241898 A  * | 9/2007 |
| JP | 2017-167608 A | 9/2017 |

OTHER PUBLICATIONS

"Detecting vehicles using machine learning and computer vision" by B. Djukic off Towards Data Science, Apr. 25, 2017 (Year: 2017).*

"Video-based Automatic Transit Vehicle Ingress/Egress Counting using Trajectory Clustering" G. Cheng et al. 2014 IEEE Intelligent Vehicles Symposium (IV) Jun. 8-11, 2014. Dearborn, Michigan, USA (Year: 2014).*

David Geronimo et al: "Survey of Pedestrain Detection for Advanced Driver Assistance Systems", IEEE Transactions on Pattern Analysis and Machine Intelligence, IEEE Computer Society, US, vol. 32, No. 7, pp. 1239-1258, XP011293817, ISSN: 0162-8828 issued on Jul. 1, 2010.

* cited by examiner

RECOGNITION PROCESSING APPARATUS, RECOGNITION PROCESSING METHOD, AND RECOGNITION PROCESSING PROGRAM

CROSS REFERENCE TO RELATED APPLICATION

The present application is a Bypass Continuation of PCT/JP2019/009896 filed on Mar. 12, 2019, which is based upon and claims the benefit of priority from Japanese Patent Application No. 2018-150967, filed on Aug. 10, 2018, the disclosure of which is incorporated herein in its entirety by reference.

BACKGROUND

The present invention relates to a recognition processing apparatus, a recognition processing method, and a recognition processing program.

In one known technique, other vehicles, persons, and so on are detected from a video capturing the surroundings of a host vehicle, and the driver is notified accordingly.

For example, Japanese Unexamined Patent Application Publication No. 2017-167608 discloses a technique with which a pedestrian that might run out from behind a parked or stopped vehicle is detected promptly.

Other vehicles that are parked or stopped in the traveling direction of a host vehicle (especially those parked or stopped on a street) are often stopped temporarily, and it is possible that a person gets out of such a stopped vehicle.

However, it is difficult, with the technique described in Japanese Unexamined Patent Application Publication No. 2017-167608 to ascertain the possibility that a person gets out of a detected vehicle and to promptly detect such a person.

SUMMARY

The embodiments provide a recognition processing apparatus that includes a video acquisition unit configured to acquire first captured image data of surroundings of a host vehicle captured by a far-infrared camera, an other vehicle detection unit configured to detect another vehicle parked or stopped in the surroundings of the host vehicle, a heat detection unit configured to detect heat radiation associated with an operation of the other vehicle based on a thermal distribution in a region corresponding to the other vehicle in the first captured image data, and a person detection unit configured to, when the heat radiation has been detected, preferentially execute person recognition in a vicinity of the other vehicle to detect a person.

The embodiments further provide a recognition processing method that includes a step of acquiring first captured image data of surroundings of a host vehicle captured by a far-infrared camera, a step of detecting another vehicle parked or stopped in the surroundings of the host vehicle, a step of detecting heat radiation associated with an operation of the other vehicle based on a thermal distribution in a region corresponding to the other vehicle in the first captured image data, and a step of, when the heat radiation has been detected, preferentially executing person recognition in a vicinity of the other vehicle to detect a person.

The embodiments further provide a recognition processing program causing a computer to execute a procedure of acquiring first captured image data of surroundings of a host vehicle captured by a far-infrared camera, a procedure of detecting another vehicle parked or stopped in the surroundings of the host vehicle, a procedure of detecting heat radiation associated with an operation of the other vehicle based on a thermal distribution in a region corresponding to the other vehicle in the first captured image data, and a procedure of, when the heat radiation has been detected, preferentially executing person recognition in a vicinity of the other vehicle to detect a person.

The embodiments can provide a recognition processing apparatus, a recognition processing method, and a recognition processing program that ascertain the possibility that a person gets out of a detected other vehicle and promptly detect such a person.

DETAILED DESCRIPTION

Hereinafter, a recognition processing apparatus and a recognition processing method according to an embodiment will be described with reference to the drawings.

First, a configuration of a recognition system that includes a recognition processing apparatus according to the present embodiment will be described.

Figure 1:
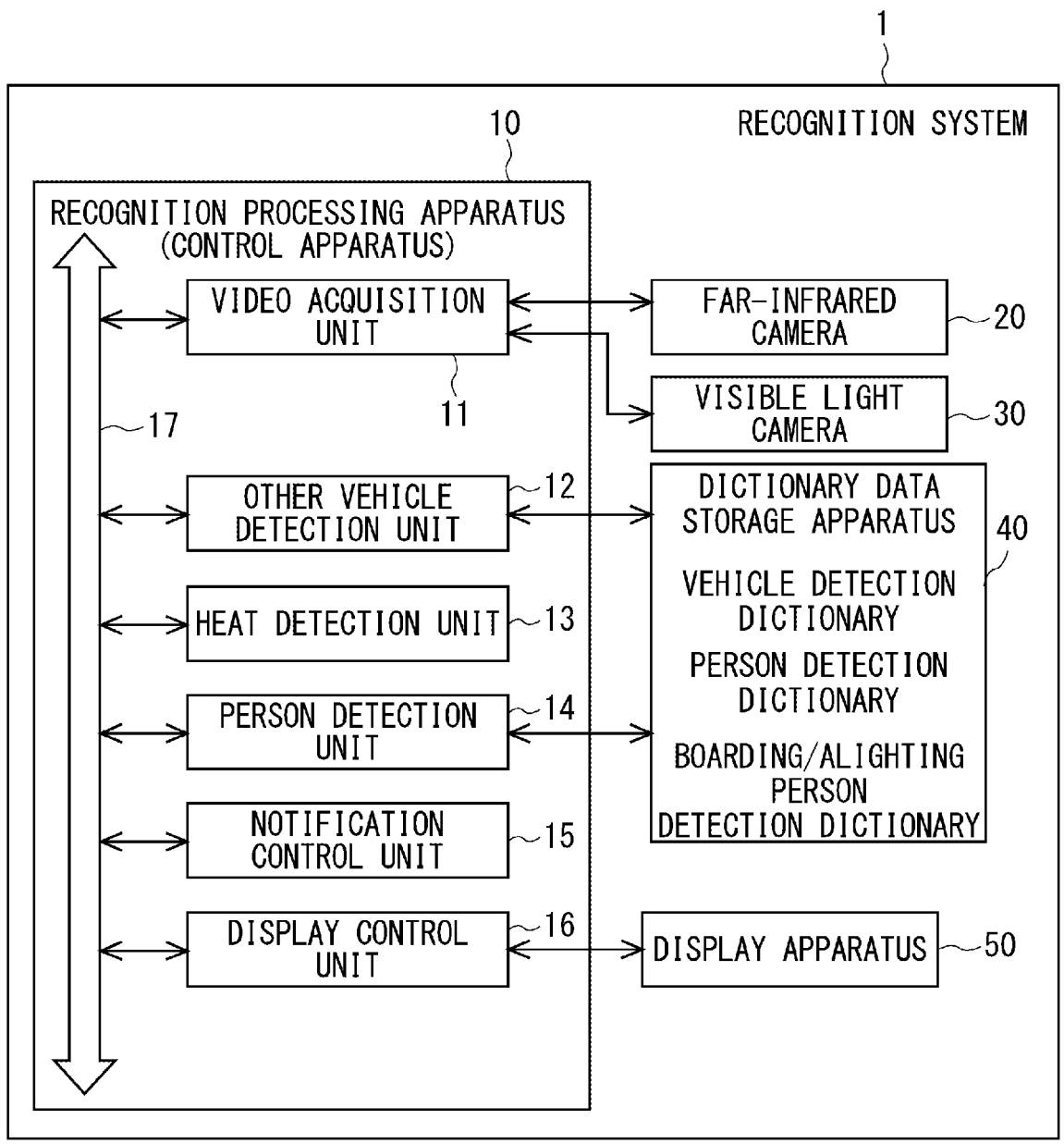
FIG. 1 is a block diagram illustrating a schematic configuration of a recognition system 1 according to an embodiment.

FIG. 1 is a block diagram illustrating a schematic configuration of a recognition system 1 according to the present embodiment.

The recognition system 1 is a system for use in a vehicle. The recognition system 1 includes a recognition processing apparatus 10, a far-infrared camera 20, a visible light camera 30, a dictionary data storage apparatus 40, and a display apparatus 50.

The recognition processing apparatus (control apparatus) 10 detects, from a video captured by the far-infrared camera 20 or the visible light camera 30, another vehicle that is parked or stopped in the surroundings of a host vehicle provided with the recognition system 1 and detects radiated heat (emitted heat) associated with an operation of the detected other vehicle. The expression "radiated heat associated with an operation" of a vehicle refers to, for example, radiated heat from a hood or a front grille in the front portion of a vehicle, radiated heat from an exhaust pipe (exhaust port) in the rear portion of a vehicle, radiated heat from a tire and its periphery, or the like. In the nighttime, the aforementioned radiated heat also includes radiated heat from a headlight or a tail lamp.

The recognition processing apparatus 10 detects a person in the vicinity of another vehicle radiating heat associated with its operation and notifies the driver of the host vehicle through a video or a sound, if necessary. The recognition processing apparatus 10 also controls an operation of the recognition system 1 as a whole.

The far-infrared camera 20 and the visible light camera 30 are provided, for example, on the front grille of the host vehicle or its peripheral portion. The far-infrared camera 20 and the visible light camera 30 capture, respectively, a far-infrared video (first captured image data) and a visible light video (second captured image data) of the surroundings of the host vehicle, or especially, of the traveling direction of the host vehicle and output the far-infrared video and the visible light video to the recognition processing apparatus 10.

In the recognition system 1 according to the present embodiment, when another vehicle and a person are to be detected with the use of both a far-infrared video and a visible light video, it is desirable to clearly define the correspondence relationship between the object positions in these videos through calibration or the like in advance.

The recognition system 1 according to the present embodiment, in place of using the two cameras—the far-infrared camera 20 and the visible light camera 30, may use a single camera provided with both the function of a far-infrared camera and the function of a visible light camera to capture each of a far-infrared video and a visible light video, or a single camera that can capture a video including a visible light range and a far-infrared range to capture a video and then separate the video into a visible light video and a far-infrared video.

The dictionary data storage apparatus 40 stores various detection dictionaries, including a vehicle detection dictionary (vehicle recognition dictionary), a person detection dictionary (person recognition dictionary), and a boarding/alighting person detection dictionary (boarding/alighting person recognition dictionary). These dictionaries are created through machine learning of videos (images) or the like in which a vehicle, a person such as a pedestrian, or a person getting in or getting out of a vehicle appears, and these dictionaries are used when the recognition processing apparatus 10 detects another vehicle, a pedestrian, or a person getting in or getting out of another vehicle in a far-infrared video or a visible light video.

For example, the boarding/alighting person detection dictionary is created through machine learning of videos captured from the front or the rear of a vehicle, including a video capturing a change in the posture of a person getting out of the vehicle starting from a state in which the person is sitting on the seat to a state in which the person stands outside the vehicle and a video capturing a change in the posture of a person getting into the vehicle starting from a state in which the person is standing outside the vehicle to a state in which the person is sitting on the seat.

The display apparatus 50 displays a video to notify the driver of the host vehicle under the control of the recognition processing apparatus 10.

To perform the above operation, the recognition processing apparatus 10 includes a video acquisition unit 11, an other vehicle detection unit 12, a heat detection unit 13, a person detection unit 14, a notification control unit 15, a display control unit 16, and a bus line 17.

The video acquisition unit 11 receives an input of a far-infrared video and a visible light video from, respectively, the far-infrared camera 20 and the visible light camera 30 and subjects these videos to various types of image processing.

The other vehicle detection unit 12 detects another vehicle in the surroundings of the host vehicle from the far-infrared video or the visible light video with the use of the vehicle detection dictionary read out from the dictionary data storage apparatus 40.

The heat detection unit 13 detects heat radiation associated with an operation of another vehicle from a far-infrared video, that is, a thermal distribution in a thermal image of the other vehicle parked or stopped in the surroundings of the host vehicle.

When heat radiation associated with an operation of the other vehicle parked or stopped in the surroundings of the host vehicle has been detected, the person detection unit 14 detects, with the use of the person detection dictionary or the boarding/alighting person detection dictionary, a person who has gotten out of the other vehicle, a person getting out of the other vehicle, or a person getting into the other vehicle from the other vehicle's nearby region in the far-infrared video or the visible light video. The other vehicle's nearby region is, for example, a region corresponding to the two-or-three-meter range from the other vehicle. The size of this region can, of course, be changed.

When no heat radiation associated with an operation is detected from another vehicle parked or stopped in the surroundings of the host vehicle, the person detection unit 14 detects, with the use of the person detection dictionary, a person such as a pedestrian from an entire frame or a portion of a frame in a far-infrared video or a visible light video.

The notification control unit 15 performs control for notifying the driver of the host vehicle, through a sound, of information concerning a detected person. The sound may be output from the recognition processing apparatus 10 or may be output from an apparatus, such as the display apparatus 50, inside or outside the recognition system 1.

The display control unit 16 performs control for notifying the driver of the host vehicle of the information concerning the detected person through a video or an image. The video and so on are displayed on the display apparatus 50.

A portion of the configuration of the recognition processing apparatus 10 may be substituted by an apparatus or the like (not illustrated) outside the recognition system 1 and connected via communication means. For example, the other vehicle detection unit 12 and the person detection unit 14 may be substituted by a recognition server outside the recognition system 1 and connected via communication means.

Each component implemented by the recognition processing apparatus 10 can be implemented, for example, by executing a program under the control of an arithmetic device (not illustrated), or a computer, included in the recognition processing apparatus 10. To be more specific, the recognition processing apparatus 10 implements each component by loading a program stored in a storage unit (not illustrated) onto a main storage device (not illustrated) and executing the program under the control of the arithmetic device.

Furthermore, each component is not limited to being implemented by software executed by a program and may instead be implemented by any combination of hardware, firmware, and software.

The above program can be stored and provided to the recognition processing apparatus 10 with the use of various types of non-transitory computer readable media. The non-transitory computer readable media include various types of tangible storage media.

Examples of the non-transitory computer readable media include magnetic storage media (e.g., a floppy disk, a magnetic tape, a hard disk drive), optical magnetic storage media (e.g., a magneto-optical disk), CD-ROM (Read Only Memory), CD-R, CD-R/W, and semiconductor memories (e.g., a mask ROM, a PROM (Programmable ROM), an EPROM (Erasable PROM), a flash ROM, a RAM (random access memory)).

The program may also be provided to the recognition processing apparatus 10 with the use of various types of transitory computer readable media. Examples of the transitory computer readable media include an electric signal, an optical signal, and an electromagnetic wave. The transitory computer readable media can provide the program to the recognition processing apparatus 10 via a wired communication line, such as an electric wire and an optical fiber, or a wireless communication line.

Next, an operation of the recognition system 1 according to the present embodiment, that is, a recognition processing method, will be described.

Figure 2:
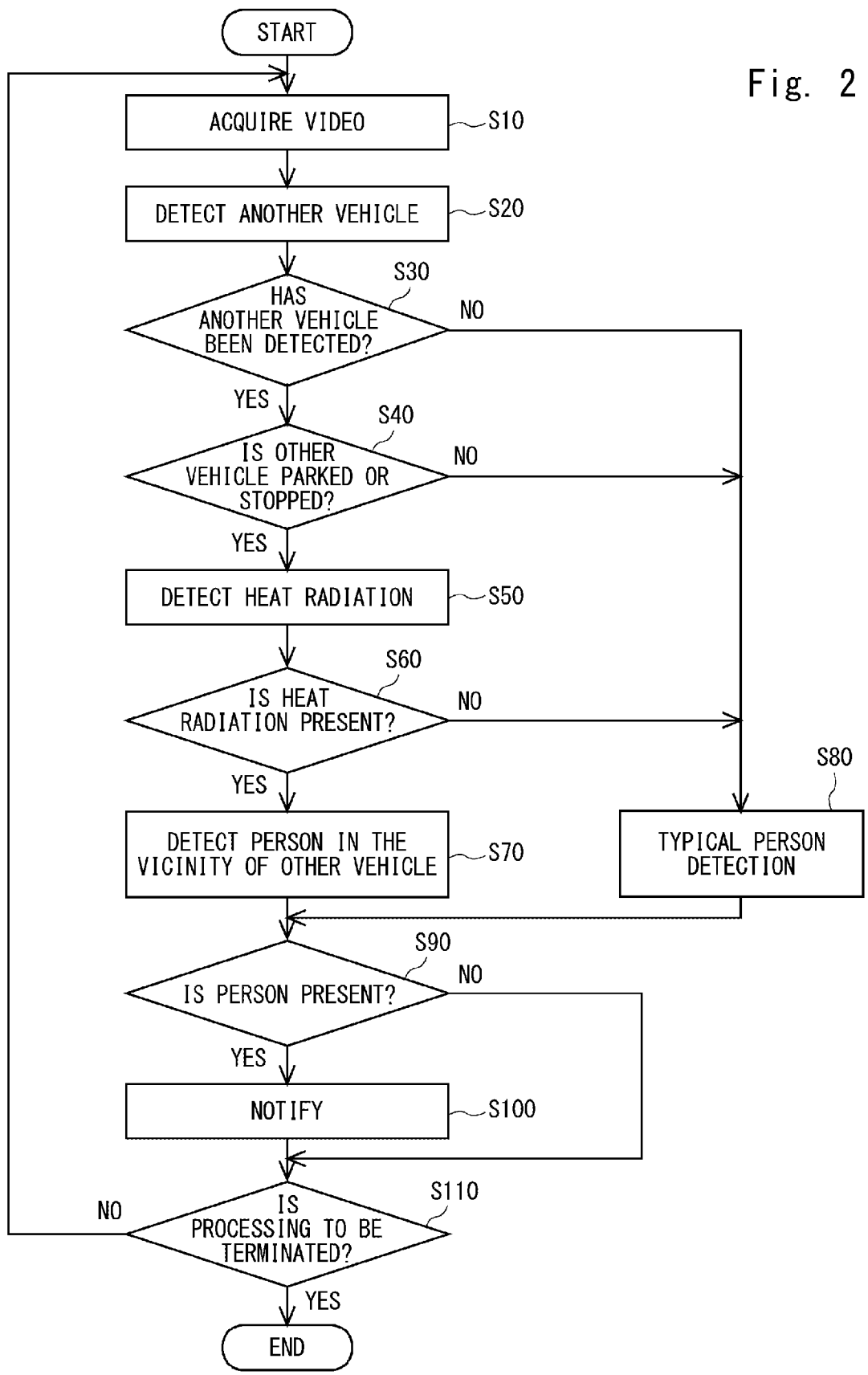
FIG. 2 is a flowchart illustrating a processing procedure of a recognition processing method according to an embodiment.

FIG. 2 is a flowchart illustrating a processing procedure of the recognition processing method according to the present embodiment.

When the recognition system 1 starts to operate, the far-infrared camera 20 and the visible light camera 30 capture, respectively, a far-infrared video and a visible light video of the traveling direction of the host vehicle, or for example, the forward direction of the host vehicle, and the video acquisition unit 11 acquires these videos (step S10). The far-infrared video and the visible light video can be captured when the host vehicle is traveling or also when the host vehicle is parked or stopped.

Next, the other vehicle detection unit 12 detects another vehicle from the far-infrared video or the visible light video with the use of the vehicle detection dictionary (step S20). Typical image recognition processing may be used to detect another vehicle.

Then, it is determined whether another vehicle has been detected (step S30), and when another vehicle has been detected (YES in step S30), it is determined whether this other vehicle is parked or stopped (step S40).

When it is determined whether the other vehicle is parked or stopped, the determination is made specifically based on whether the other vehicle is stopped and based on the position and the condition of this other vehicle.

For example, when the positional relationship between the detected other vehicle and an object (a road surface, a building, or the like) surrounding this vehicle is constant, it is determined that the other vehicle is stopped.

When the stopped other vehicle is located to the left side of the host vehicle's traveling lane, when the stopped other vehicle is on the outer lane-dividing line (the dividing line located by a curb of a road or a lane), when the hazard warning lamp of the stopped other vehicle is on, or when the brake lamps of the stopped other vehicle are not on, it is determined that this other vehicle is parked or stopped.

When the detected other vehicle is an oncoming vehicle, or in particular when the detected other vehicle is an oncoming vehicle in a road environment where no center line is present on the road, a determination can be made in a similar manner.

When it is determined that the detected other vehicle is parked or stopped (YES in step S40), the heat detection unit 13 detects heat radiation from this other vehicle based on a thermal distribution in a region corresponding to this other vehicle in the far-infrared image (step S50).

Figure 3:
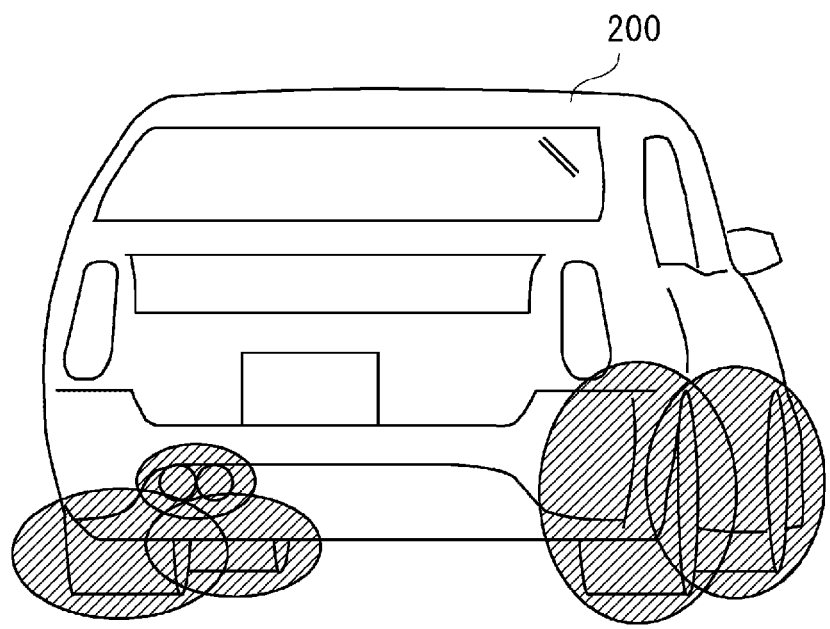
FIG. 3 is an illustration for describing a thermal distribution in a far-infrared image according to an embodiment.
Figure 4:
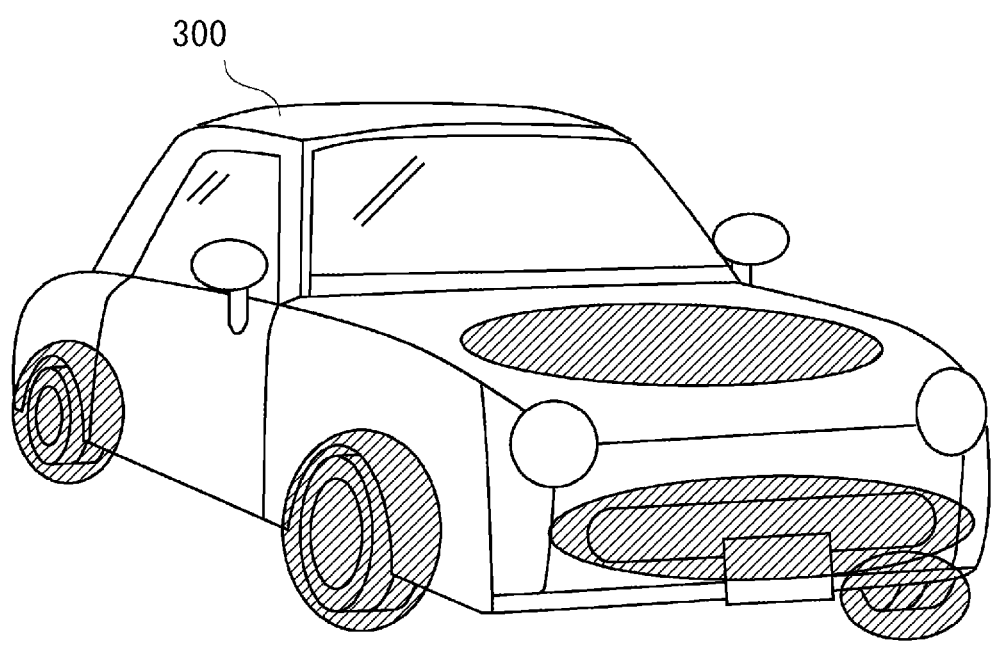
FIG. 4 is another illustration for describing a thermal distribution in a far-infrared image according to an embodiment.

FIGS. 3 and 4 are illustrations for describing a thermal distribution in a far-infrared image according to the present embodiment. In FIGS. 3 and 4, to make the drawings easier to understand, hatching is added to a region with a high luminance, that is, a region with a high temperature.

FIG. 3 illustrates another vehicle 200 facing the same direction as the host vehicle, and the portions such as the exhaust pipe (exhaust port) and the tires have a high temperature due to radiated heat associated with an operation of this other vehicle. FIG. 4 illustrates another vehicle 300 facing a direction opposite to the direction of the host vehicle. The portions such as the hood, the front grille, and the tires have a high temperature in a similar manner. In the nighttime, the portions such as the tail lamps and the headlights may also have a high temperature.

Next, it is determined whether the other vehicle is radiating heat associated with its operation (step S60). Herein, it is determined that the other vehicle is radiating heat associated with its operation if the portions with hatching in FIGS. 3 and 4 have a temperature higher by no less than a predetermined value (e.g., 5° C.) than the temperature of their peripheral portions or of the road surface. In other words, when a portion that emits heat as the other vehicle operates has a relatively higher temperature than the remaining portion, it is determined that the other vehicle is radiating heat associated with its operation.

Then, when it is determined that the other vehicle is radiating heat associated with its operation (YES in step S60), the person detection unit 14 preferentially sets the other vehicle's nearby region in the far-infrared video or the visible light video as a detection target region and detects a person getting into or getting out of the other vehicle with the use of the person detection dictionary or the boarding/alighting person detection dictionary read out from the dictionary data storage apparatus 40 (step S70). Typical image recognition processing may be used to detect a person getting into or getting out of a vehicle. The use of the boarding/alighting person detection dictionary allows any person getting into or getting out of the vehicle to be detected with higher accuracy.

Because a person getting into or getting out of a vehicle changes his/her posture more than a pedestrian does, the person detection unit 14 may detect a person getting into or getting out of the other vehicle based on a change in the posture of the person among a plurality of frames. The person detection unit 14 may identify this person as a person getting into or getting out of the other vehicle or as a pedestrian based on the height of the detected person in the image.

The person detection unit 14 may preferentially set the other vehicle's nearby region as a detection target region and, after a person getting into or getting out of the other vehicle is detected (or not detected), set an entire frame or a portion of a frame in the far-infrared video or the visible light video as a detection target region to detect a pedestrian or the like.

Furthermore, when it is determined that the other vehicle is not radiating heat associated with its operation (NO in step S60), the person detection unit 14 sets an entire frame or a portion of a frame in the far-infrared video or the visible light video as a detection target region and detect a pedestrian or the like with the use of the person detection dictionary read out from the dictionary data storage apparatus 40 (step S80). Typical image recognition processing may be used to detect a pedestrian. In step S80, a range where a person may be present in the video (image) may be identified through edge detection processing or the like, for example.

Next, it is determined whether a person getting into or getting out of the other vehicle, a pedestrian, or the like has been detected in step S70 or step S80 (step S90).

When it is determined that a person getting into or getting out of the other vehicle, a pedestrian, or the like has been detected (YES in step S90), the notification control unit 15 notifies the driver of the host vehicle, through a sound or the like, that a pedestrian or the like has been detected, or the display control unit 16 displays, on the display apparatus 50, a message indicating that a pedestrian or the like has been detected (step S100).

Then, it is determined whether to terminate the recognition processing method (step S110). When it is determined to terminate the recognition processing method (YES in step S110), the processing is terminated. When it is determined not to terminate the recognition processing method (NO in step S110), a next video is acquired (step S10), for example.

When the other vehicle detection unit 12 detects no other vehicle (NO in step S30) or when it is determined that the detected other vehicle is not parked or stopped (NO in step S40), the person detection unit 14 sets the entirety or a portion of each frame in the far-infrared video or the visible light video as a detection target region and detects a pedestrian or the like (step S80).

When it is determined that no person getting into or getting out of the vehicle or no pedestrian is detected (NO in step S90), it is determined whether to terminate the recognition processing method (step S110).

In this manner, the recognition system 1 or the recognition processing method according to the present embodiment can, based on the presence of radiated heat from another vehicle detected in a video, ascertain the possibility that a person gets out of the detected vehicle and promptly detect such a person.

It is to be noted that various additions, modifications, and changes can be made to the recognition system 1 or the recognition method according to the present embodiment.

As described above, the other vehicle detection unit 12 and the person detection unit 14 can detect another vehicle and a person (a person getting into or getting out of a vehicle, a pedestrian, etc.) with the use of a far-infrared video and a visible light video. The other vehicle detection unit 12 and the person detection unit 14 can also detect another vehicle and a person with the use of only one of a far-infrared video and a visible light video. For example, another vehicle can be detected with the use of a far-infrared video, and a person can be detected with the use of a visible light video.

The other vehicle detection unit 12 and the person detection unit 14 can also detect another vehicle and a person with the use of only a far-infrared video. This renders a visible light video unnecessary and in turn renders the visible light camera 30 unnecessary. In other words, the recognition system 1 may be configured without the visible light camera 30.

When it is determined whether the detected other vehicle is radiating heat associated with its operation (step S60), processing (step S70, step S80) of the person detection unit 14 performed thereafter may be selected in accordance with which portion of the other vehicle is radiating heat.

For example, when a portion near the exhaust pipe is radiating heat, the engine may be in operation, or not much time has passed after the engine was stopped. Therefore, detection of a person getting into or getting out of the vehicle (step S70) may be performed preferentially. When a portion near the exhaust pipe is not radiating heat, some time has passed after the engine was stopped. Therefore, detection of a pedestrian (step S80) may be performed.

When a portion near the exhaust pipe and portions near the tires are both radiating heat, the engine may be in operation, or not much time has passed after the engine was stopped, and not much time has passed after the vehicle stopped traveling. Therefore, detection of a person getting into or getting out of the vehicle (step S70) may be performed preferentially. When a portion near the exhaust pipe is radiating heat but portions near the tires are not radiating heat, the engine may be in operation, or not much time has passed after the engine was stopped, but some time has passed after the vehicle stopped traveling. Therefore, detection of a pedestrian (step S80) may be performed.

When portions near the tires are radiating heat, not much time has passed after the vehicle stopped traveling. Therefore, detection of a person getting into or getting out of the vehicle (step S70) may be performed preferentially. When portions near the tires are not radiating heat, some time has passed after the vehicle stopped traveling. Therefore, detection of a pedestrian (step S80) may be performed.

When it is determined whether the detected other vehicle is radiating heat associated with its operation (step S60), in place of making a determination based on a comparison between the temperature of portions such as the exhaust pipe and the tires and the temperature of their peripheral portions or the road surface, the determination may be made based on the detected temperature of the portions such as the exhaust pipe and the tires. For example, when the detected temperature of the exhaust pipe is no lower than a predetermined value (e.g., 40° C.), it may be determined that the detected other vehicle is radiating heat associated with its operation.

When it is determined whether the detected other vehicle is radiating heat associated with its operation (step S60), the determination may be made based on the range where the temperature of the other vehicle is high.

The configuration of the recognition system 1 is not limited to the one described above. A plurality of apparatuses, such as the recognition processing apparatus 10 and the dictionary data storage apparatus 40, may be integrated into a unit to serve as a recognition processing apparatus provided with a dictionary data storage unit. Furthermore, all the components of the recognition system 1 may be integrated into a unit to serve as a recognition processing apparatus provided with a far-infrared camera, a visible light camera, a dictionary data storage unit, and a display unit.

With regard to the use in host vehicles, in addition to a mode in which a part or the whole of the recognition system 1 is mounted in a host vehicle, a mode in which the recognition system 1 is portably mounted in a host vehicle or is custom installable may also be employed.

In place of performing image recognition with the use of a dictionary created through machine learning of images of a vehicle, a person, and so on, or in addition to performing image recognition with the use of a dictionary created through machine learning, the other vehicle detection unit 12 and person detection unit 14 may perform different image recognition, such as pattern matching with the use of a template of another vehicle, a person, or the like, for example.

As described thus far, the recognition processing apparatus 10 according to the present embodiment includes the video acquisition unit 11 that acquires the first captured image data of the surroundings of the host vehicle captured by the far-infrared camera 20, the other vehicle detection unit 12 that detects another vehicle parked or stopped in the surroundings of the host vehicle, the heat detection unit 13 that detects radiated heat associated with an operation of the other vehicle based on a thermal distribution in a region corresponding to the other vehicle in the first captured image data, and the person detection unit 14 that, when the radiated heat has been detected, preferentially executes person recognition on the vicinity of the other vehicle to detect a person.

In the recognition processing apparatus 10 according to the present embodiment, the other vehicle detection unit 12 can detect another vehicle from the first captured image data, and the person detection unit 14 can detect a person from the first captured image data.

In the recognition processing apparatus 10 according to the present embodiment, the video acquisition unit 11 can further acquire the second captured image data of the surroundings of the host vehicle captured by the visible light camera 30, the other vehicle detection unit 12 can detect another vehicle from the first captured image data, and the person detection unit 14 can detect a person from the second captured image data.

In the recognition processing apparatus 10 according to the present embodiment, the video acquisition unit 11 can further acquire the second captured image data of the surroundings of the host vehicle captured by the visible light camera 30, the other vehicle detection unit 12 can detect another vehicle from the second captured image data, and the person detection unit 14 can detect a person from the first captured image data.

In the recognition processing apparatus 10 according to the present embodiment, the video acquisition unit 11 can further acquire the second captured image data of the surroundings of the host vehicle captured by the visible light camera 30, the other vehicle detection unit 12 can detect another vehicle from the second captured image data, and the person detection unit 14 can detect a person from the second captured image data.

In the recognition processing apparatus 10 according to the present embodiment, when the heat detection unit 13 has detected the radiated heat, the person detection unit 14 can preferentially execute person recognition in the other vehicle's nearby range with the use of the boarding/alighting person recognition dictionary to detect a person.

In the recognition processing apparatus 10 according to the present embodiment, the heat detection unit 13 can detect radiated heat associated with an operation of the other vehicle based on a thermal distribution range of a region corresponding to the other vehicle in the first captured image data.

The recognition processing apparatus 10 according to the present embodiment can further include the notification control unit 15 that, when the person detection unit 14 has detected a person, notifies the driver of the host vehicle that the person has been detected.

The recognition processing method according to the present embodiment includes step S10 of acquiring the first captured image data of the surroundings of the host vehicle captured by the far-infrared camera 20, step S20 of detecting another vehicle parked or stopped in the surroundings of the host vehicle, step S50 of detecting radiated heat associated with an operation of the other vehicle based on a thermal distribution in a region corresponding to the other vehicle in the first captured image data, and step S70 of, when the radiated heat has been detected, preferentially executing person recognition on the vicinity of the other vehicle to detect a person.

The recognition processing apparatus, the recognition processing method, or the recognition processing program according to the embodiments can be used in a vehicle or the like, ascertain the possibility that a person gets out of a detected other vehicle, and promptly detect such a person, and therefore has industrial applicability.

What is claimed is:

1. A recognition processing apparatus comprising:
    a video acquisition unit configured to acquire first captured image data of surroundings of a host vehicle captured by a far-infrared camera;
    an other vehicle detection unit configured to detect another vehicle parked or stopped in the surroundings of the host vehicle;
    a heat detection unit configured to detect radiated heat associated with an operation of the other vehicle based on a thermal distribution in a region corresponding to the other vehicle in the first captured image data; and
    a person detection unit configured to perform person recognition on an entirety of the first captured image data by a person detection dictionary when no radiated heat associated with the operation of the other vehicle is detected,
    wherein, when the radiated heat associated with the operation of the other vehicle is detected, the person detection unit is configured to;
        set a vicinity of the other vehicle as a first detection target region, and then execute a first person recognition in the first detection target region by a boarding/alighting person detection dictionary to detect a person getting into or getting out of the other vehicle; and
        set the entirety of the first captured image data as a second detection target region, and then execute a recognition of a second person in the second target detection region by the person detection dictionary to detect a pedestrian after the first person recognition, and
    wherein the boarding/alighting person detection dictionary is created based on a video capturing a change in a posture of a person getting out of the vehicle starting from a state in which the person is sitting on a seat to a state in which the person stands outside the vehicle and a video capturing a change in the posture of a person getting into the vehicle starting from a state in which the person is standing outside the vehicle to a state in which the person is sitting on the seat.

2. The recognition processing apparatus according to claim 1, wherein the other vehicle detection unit detects the other vehicle from the first captured image data, and
    wherein the person detection unit detects the person from the first captured image data.

3. The recognition processing apparatus according to claim 1, wherein the video acquisition unit further acquires second captured image data of the surroundings of the host vehicle captured by a visible light camera, and
    wherein the other vehicle detection unit detects the other vehicle from the first captured image data, and
    wherein the person detection unit detects the person from the second captured image data.

4. The recognition processing apparatus according to claim 1, wherein the video acquisition unit further acquires second captured image data of the surroundings of the host vehicle captured by a visible light camera,
    wherein the other vehicle detection unit detects the other vehicle from the second captured image data, and
    wherein the person detection unit detects the person from the first captured image data.

5. The recognition processing apparatus according to claim 1, wherein the video acquisition unit further acquires second captured image data of the surroundings of the host vehicle captured by a visible light camera,
    wherein the other vehicle detection unit detects the other vehicle from the second captured image data, and
    wherein the person detection unit detects the person from the second captured image data.

6. The recognition processing apparatus according to claim 1, wherein the heat detection unit detects radiated heat associated with an operation of the other vehicle based on a thermal distribution in a region that emits heat in association with the operation of the other vehicle in the first captured image data.

7. The recognition processing apparatus according to claim 1, further comprising a notification control unit that, when the person detection unit has detected the person, notifies a driver of the host vehicle that the person has been detected.

8. A recognition processing method executed by a recognition processing apparatus, the recognition processing method comprising:
- acquiring first captured image data of surroundings of a host vehicle captured by a far-infrared camera;
- detecting an other vehicle parked or stopped in the surroundings of the host vehicle;
- detecting radiated heat associated with an operation of the other vehicle based on a thermal distribution in a region corresponding to the other vehicle in the first captured image data; and
- performing person recognition on an entirety of the first captured image data by a person detection dictionary when no radiated heat associated with the operation of the other vehicle is detected,
- wherein, when the radiated heat associated with the operation of the other vehicle is detected;
  - a vicinity of the other vehicle is set as a first detection target region, and then a first person recognition is executed in the first detection target region by a boarding/alighting person detection dictionary to detect a person getting into or getting out of the other vehicle; and
  - the entirety of the first captured image data is set as a second detection target region, and then a recognition of a second person in the second target detection region is executed by the person detection dictionary to detect a pedestrian after the first person recognition, and
- wherein the boarding/alighting person detection dictionary is created based on a video capturing a change in a posture of a person getting out of the vehicle starting from a state in which the person is sitting on a seat to a state in which the person stands outside the vehicle and a video capturing a change in the posture of a person getting into the vehicle starting from a state in which the person is standing outside the vehicle to a state in which the person is sitting on the seat.

9. A non-transitory computer readable medium storing a recognition processing program causing a computer to execute:
- acquiring first captured image data of surroundings of a host vehicle captured by a far-infrared camera;
- detecting an other vehicle parked or stopped in the surroundings of the host vehicle;
- detecting radiated heat associated with an operation of the other vehicle based on a thermal distribution in a region corresponding to the other vehicle in the first captured image data; and
- performing person recognition on an entirety of the first captured image data by a person detection dictionary when no radiated heat associated with the operation of the other vehicle is detected,
- wherein, when the radiated heat associated with the operation of the other vehicle is detected;
  - a vicinity of the other vehicle is set as a first detection target region, and then a first person recognition is executed in the first detection target region by a boarding/alighting person detection dictionary to detect a person getting into or getting out of the other vehicle; and
  - the entirety of the first captured image data is set as a second detection target region, and then a recognition of a second person in the second target detection region is executed by the person detection dictionary to detect a pedestrian after the first person recognition, and
- wherein the boarding/alighting person detection dictionary is created based on a video capturing a change in a posture of a person getting out of the vehicle starting from a state in which the person is sitting on a seat to a state in which the person stands outside the vehicle and a video capturing a change in the posture of a person getting into the vehicle starting from a state in which the person is standing outside the vehicle to a state in which the person is sitting on the seat.

* * * * *